(12) United States Patent
Mele et al.

(10) Patent No.: US 8,676,134 B2
(45) Date of Patent: Mar. 18, 2014

(54) HIGHLY RELIABLE RECEIVER FRONT-END

(75) Inventors: Renata Mele, Milan (IT); Fabrizio Ricci, Milan (IT); Stefano Serra, Milan (IT)

(73) Assignees: Pirelli & C. S.p.A., Milan (IT); Telecom Italia S.p.A., Milan (IT)

( * ) Notice: Subject to any disclaimer, the term of this patent is extended or adjusted under 35 U.S.C. 154(b) by 582 days.

(21) Appl. No.: 10/563,286

(22) PCT Filed: Jul. 4, 2003

(86) PCT No.: PCT/EP03/07187
§ 371 (c)(1),
(2), (4) Date: Apr. 18, 2008

(87) PCT Pub. No.: WO2005/006578
PCT Pub. Date: Jan. 20, 2005

(65) Prior Publication Data
US 2008/0242242 A1    Oct. 2, 2008

(51) Int. Cl.
*H04B 1/38* (2006.01)
(52) U.S. Cl.
USPC .......... 455/90.2; 455/424; 455/425; 455/456; 455/561
(58) Field of Classification Search
USPC ........ 455/424, 425, 456.5, 561, 550.1, 575.1, 455/501, 67.13, 90.2, 213, 307, 334, 277.1; 333/155, 229, 234; 343/893, 853
See application file for complete search history.

(56) References Cited

U.S. PATENT DOCUMENTS

| | | | | |
|---|---|---|---|---|
| 3,744,467 A | * | 7/1973 | Wagner | 123/179.3 |
| 5,023,939 A | * | 6/1991 | Hori | 455/188.1 |
| 5,215,959 A | * | 6/1993 | Van Duzer | 505/201 |
| 5,472,935 A | * | 12/1995 | Yandrofski et al. | 505/210 |
| 5,604,925 A | | 2/1997 | O'Malley et al. | |
| 5,835,853 A | * | 11/1998 | Enoki et al. | 455/180.1 |
| 6,011,524 A | * | 1/2000 | Jervis | 343/895 |
| 6,104,934 A | * | 8/2000 | Patton et al. | 455/561 |

(Continued)

FOREIGN PATENT DOCUMENTS

| | | |
|---|---|---|
| EP | 1 233 537 A1 | 8/2002 |
| WO | WO 01/56170 A2 | 8/2001 |
| WO | WO 02/21708 A2 | 3/2002 |

OTHER PUBLICATIONS

Ter Brake, H J. M. et al., "Low-Power Cryocooler Survey," Cryogenics, vol. 42, pp. 705-718, (2002).
Lancaster, M. J., "Superconducting Filters", Chapter 5, Passive Microwave Device Applications of High-Temperature Superconductors, Cambridge University Press, pp. 144-202, (1997).

*Primary Examiner* — Ajibola Akinyemi
(74) *Attorney, Agent, or Firm* — Finnegan, Henderson, Farabow, Garrett & Dunner, L.L.P.

(57) ABSTRACT

A receiver front-end for use in a transceiver station of a wireless communication network. The transceiver station is associated with an antenna assembly having a primary and at least a secondary antenna. The receiver front-end is adapted for insertion between the antenna assembly and signal processing sections of the transceiver station. The receiver front-end includes a primary and at least a secondary receiving branch, the primary receiving branch being adapted for coupling to the primary antenna and to the signal processing sections of the transceiver station, the secondary receiving branch being adapted for coupling to the secondary antenna and to the signal processing sections. The primary receiving branch has nonsuperconducting components, including at least a non superconducting filter while the secondary receiving branch has at least a superconducting component.

20 Claims, 10 Drawing Sheets

(56) References Cited

U.S. PATENT DOCUMENTS

| | | |
|---|---|---|
| 6,263,215 B1 * | 7/2001 | Patton et al. .................. 455/561 |
| 6,367,266 B1 * | 4/2002 | Kobayashi et al. ............ 62/51.1 |
| 6,424,135 B1 * | 7/2002 | Russo ........................... 323/360 |
| 6,622,028 B1 * | 9/2003 | Abdelmonem et al. ....... 455/561 |
| 6,688,127 B2 * | 2/2004 | Laubacher et al. ........... 62/259.2 |
| 2002/0151331 A1 * | 10/2002 | Abdelmonem et al. ....... 455/561 |
| 2003/0227350 A1 * | 12/2003 | Abdelmonem ............... 333/99 S |
| 2005/0164888 A1 * | 7/2005 | Hey-Shipton ................. 505/210 |
| 2008/0174470 A1 * | 7/2008 | Lum et al. ....................... 342/16 |

* cited by examiner

HIGHLY RELIABLE RECEIVER FRONT-END

CROSS REFERENCE TO RELATED APPLICATION

This application is a national phase application based on PCT/EP2003/007187, filed Jul. 4, 2003, the content of which is incorporated herein by reference.

BACKGROUND OF THE INVENTION

1. Field of the Invention

The present invention generally relates to the field of mobile telephony and particularly to a wireless communication network. More particularly, the present invention relates to a highly reliable wireless communication station receiver front-end for use in a wireless communication network, for example a $3^{rd}$ Generation (3G) wireless communication network.

2. Description of the Related Art

In a wireless communication network, geographic areas are subdivided into a plurality of cells. The traffic in each cell is handled by a transceiver station for transmitting and/or receiving radio signals (voice and/or data) to/from mobile terminals. Such transceiver stations can be equipped with receiver front-ends whose main function is to select and amplify the radio signals that are received by an antenna connected to the receiver and are within the frequency range useful for communication and to attenuate all other potentially interfering signals.

A receiver front-end can be connected to two antennas, a primary antenna and a diversity antenna. The primary antenna is associated with both a primary receive path and a transmit path, while the diversity antenna is coupled to a diversity receive path, which includes a conventional bandpass filter and a low-noise amplifier. After the primary antenna, the primary receive path includes a conventional bandpass filter disposed within a conventional duplexer and an additional low-noise amplifier. The conventional duplexer further includes a conventional transmit filter coupled to the primary antenna as part of the transmit path.

Typically, communication from the mobile terminal to the transceiver station is characterized by radio signals having rather low power. Such radio signals are therefore subject to degradation in the presence of noise.

As disclosed in U.S. Pat. No. 6,263,215, in order to increase significantly the signal-to-noise ratio and hence the sensitivity of transceiver stations in receiving the radio signals transmitted by the mobile terminals, the stations can be equipped with cryogenic receiver front-ends.

In WO 02/21708 is for example disclosed a wireless base station cryogenic unit configuration including a diversity antenna and a main receiver. Main receiver receives and transmits signals simultaneously, wherein diversity receiver only receives signals. The corresponding signals are transmitted directly to a cryogenic unit in the case of the diversity antenna and to a diplexer for the main receiver before being forwarded to the cryogenic unit.

The diplexer is comprised of filters for separating the signal into a transmission signal component and a received signal component. The received signal component is then transmitted to the cryogenic unit. The cryogenic unit is comprised of HTS filters with amplifiers. Generally, amplifiers are low-noise amplifiers (LNA). The received signal is then forwarded to the amplifiers and in the case of the main receiver electrical pathway, diplexed with the transmission component of the signal by a further diplexer and then it is transmitted to the remaining sections of the base station.

The Applicant has observed that the above described receiver front-end has a relatively low reliability due to the fact that HTS filters and consequently the receiver front-end, become non-operative if the cryogenic unit does not work properly, for example due to refrigerator problems.

The Applicant faced the problem of realizing a receiver front-end having good performances and improved reliability.

SUMMARY OF THE INVENTION

Applicant has found that a receiver front-end comprising a primary and a secondary receiving branch, wherein the primary receiving branch includes non-superconducting components and does not include superconducting components and wherein the secondary receiving branch includes at least a superconducting component, such as a superconducting filter, has, in comparison to known superconducting front-ends, a good performance under proper operating conditions, i.e. under proper refrigeration of the superconducting component, while also having improved reliability. In case of improper refrigeration, such as in case of fault of the cryo-cooling equipment, the performance of the invention receiver front-end is substantially affected only as to the secondary receiving branch, while the primary receiving branch continues to operate although with a slightly higher noise figure.

According to an aspect of the present invention, there is provided a receiver front-end for use in a transceiver station of a wireless communication network, said transceiver station being associated to an antenna assembly comprising a primary and at least a secondary antenna, said receiver front-end being adapted for insertion between said antenna assembly and signal processing sections of said transceiver station, said receiver front-end including a primary and at least a secondary receiving branch, said primary receiving branch being adapted for coupling to said primary antenna and to said signal processing sections of said transceiver station and said secondary receiving branch being adapted for coupling to said secondary antenna and to said signal processing sections, characterized in that said primary receiving branch comprises non-superconducting components, including at least a non-superconducting filter, and said secondary receiving branch comprises at least a superconducting component.

Moreover, said primary receiving branch does not comprise superconducting components.

In particular, said superconducting component comprise a low-loss filter obtained with a technology based on high critical temperature superconducting materials.

Further, said secondary receiving branch comprises a cryogenic, low-noise amplifier cascade connected to said low-loss filter.

Said low-loss filter and said cryogenic, low-noise amplifier are both enclosed in a cryogenic refrigerator unit operating at cryogenic temperatures.

In a first aspect of the present invention, said primary receiving branch comprises a non-superconducting receiving filter and a non-cryogenic, low-noise amplifier (18) mutually connected in cascade arrangement.

In a second aspect of the present invention, said primary receiving branch comprises a non-superconducting receiving filter and a cryogenic, low-noise amplifier mutually connected in cascade arrangement.

Preferably, said low-loss filter, said cryogenic, low-noise amplifier of said primary receiving branch and said cryogenic, low-noise amplifier of said secondary receiving branch are enclosed in said cryogenic refrigerator unit.

Preferably said cryogenic refrigerator unit operates at cryogenic temperatures lower than 250 K.

More preferably, said cryogenic refrigerator unit operates at cryogenic temperatures lower than 100 K.

Still more preferably said cryogenic refrigerator unit operates at cryogenic temperatures higher than 60 K.

Preferably, said low-loss filter has a noise figure lower that 0.7 dB.

More preferably, said low-loss filter has a noise figure lower that 0.5 dB.

Still more preferably, said low-loss filter has a noise figure lower that 0.3 dB.

According to the present invention said primary receiving branch is connected in parallel to a primary transmission branch, said primary transmission branch comprising a transmitting filter.

Said secondary receiving branch can also be connected in parallel to a secondary transmission branch, said secondary transmission branch comprising a transmitting filter.

Preferably, said transmitting filter comprised in said secondary transmission branch is obtained with a technology based on high critical temperature superconducting materials.

The receiver front-end is mounted at such a distance from said antenna assembly that losses due to antenna lead-in are negligible with respect to the noise figure introduced by said receiver front-end.

According to a further aspect of the present invention, a method for improving reliability of a receiver front-end for use in a transceiver station of a wireless communication network comprising the steps of:

sending primary and secondary radio signals to a primary and, respectively, a secondary antenna, said primary and secondary antenna being included in an antenna assembly comprised in said transceiver station;

filtering said primary radio signal at non-cryogenic temperatures;

processing said secondary radio signal at cryogenic temperatures; and sending the resulting primary and secondary radio signals to signal processing sections of said transceiver station.

The step of processing said secondary radio signal at cryogenic temperatures comprises the step of:

filtering said secondary radio signal to select a desired frequency band within a communication band; and amplifying said filtered secondary radio signal without introducing any significant losses.

In a first aspect of the present invention said method further comprises the step of amplifying said primary radio signal at non-cryogenic temperatures.

Alternative, said method comprises the step of amplifying said primary radio signal at cryogenic temperatures.

According to another aspect of the present invention a transceiver station comprising a receiver front-end and signal processing sections coupled to said receiver front-end.

BRIEF DESCRIPTION OF THE DRAWINGS

The features and advantages of the present invention will be made apparent by the following detailed description of some embodiments thereof, provided merely by way of non-limitating examples, which will be made referring to the attached drawings, wherein.

DETAILED DESCRIPTION OF THE INVENTION

Figure 1:
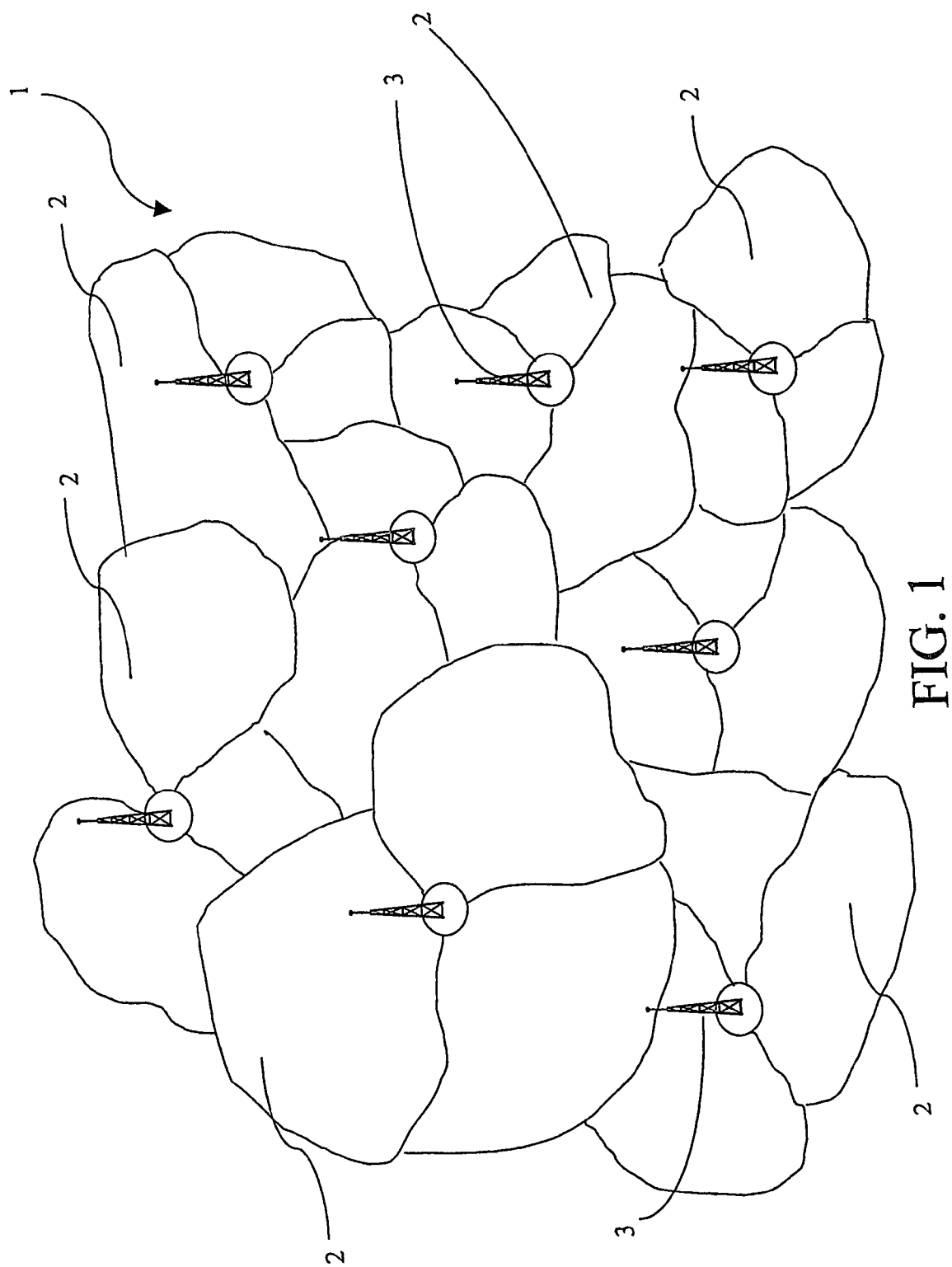
FIG. 1 is a schematic representation of a mobile communication network.

With reference to FIG. 1, the present invention may be practiced in connection with a wireless communication network 1, for example a $3^{rd}$ Generation (3G) wireless communication network (in particular UMTS), comprising a plurality of cells 2. The traffic present in each cell 2 is handled by a transceiver station 3 for transmitting and/or receiving radio signals (voice and/or data) to/from communication devices such as cellular telephones, PDAs, computers, etc., located in the cell.

Figure 2:
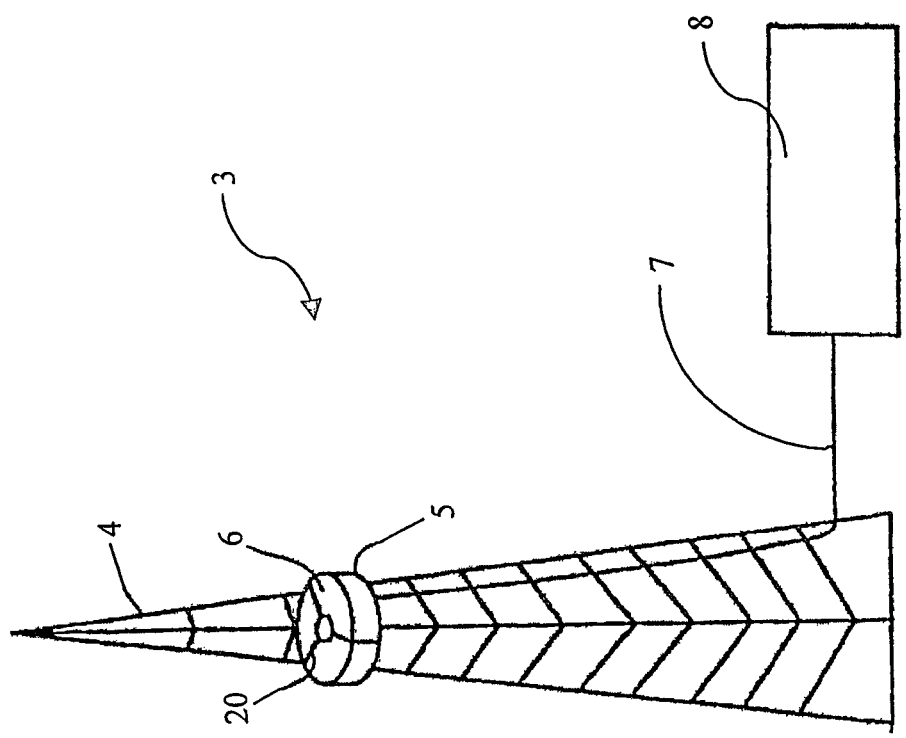
FIG. 2 shows a transceiver station with a tower mounted receiver front-end.

As shown in FIG. 2, each transceiver station 3 includes a tower 4 equipped with an antenna assembly 5. The transceiver station 3 also comprises a receiver front-end 6 coupled to the antenna assembly 5 and, via coaxial cables 7, to signal processing sections, generally referred to at 8, of the transceiver station 3.

The antenna assembly 5 can comprise an omni-directional antenna (primary antenna) and at least a diversity antenna (secondary antenna).

Alternatively, the antenna assembly 5 can be divided into two or more sectors, where each sector is designed to receive signals from different geographic locations. Each sector can contain a primary antenna and at least a secondary (diversity) antenna both coupled to the receiver front-end.

The receiver front-end 6 is preferably mounted at such a distance from the antenna assembly 5 that the losses due to the antenna assembly lead-in are negligible relative to the noise figure introduced by the receiver front-end. Preferably, said distance is no greater than 3 m. More preferably said distance is no greater than 1 m.

With reference to FIGS. 3, 4, 5, 6 the antenna assembly 5 includes a primary (main) antenna 9 and at least a secondary (diversity) antenna 10. The secondary antenna 10 can be located at a minimum distance from the primary antenna 9 so as to have slightly different reception characteristics (space diversity). Alternatively, the two antennas 9, 10 can have polarization diversity. In this case, the antennas can be made by two orthogonal series of conducting elements rotated of ±45° with respect to a vertical direction.

Figure 3:
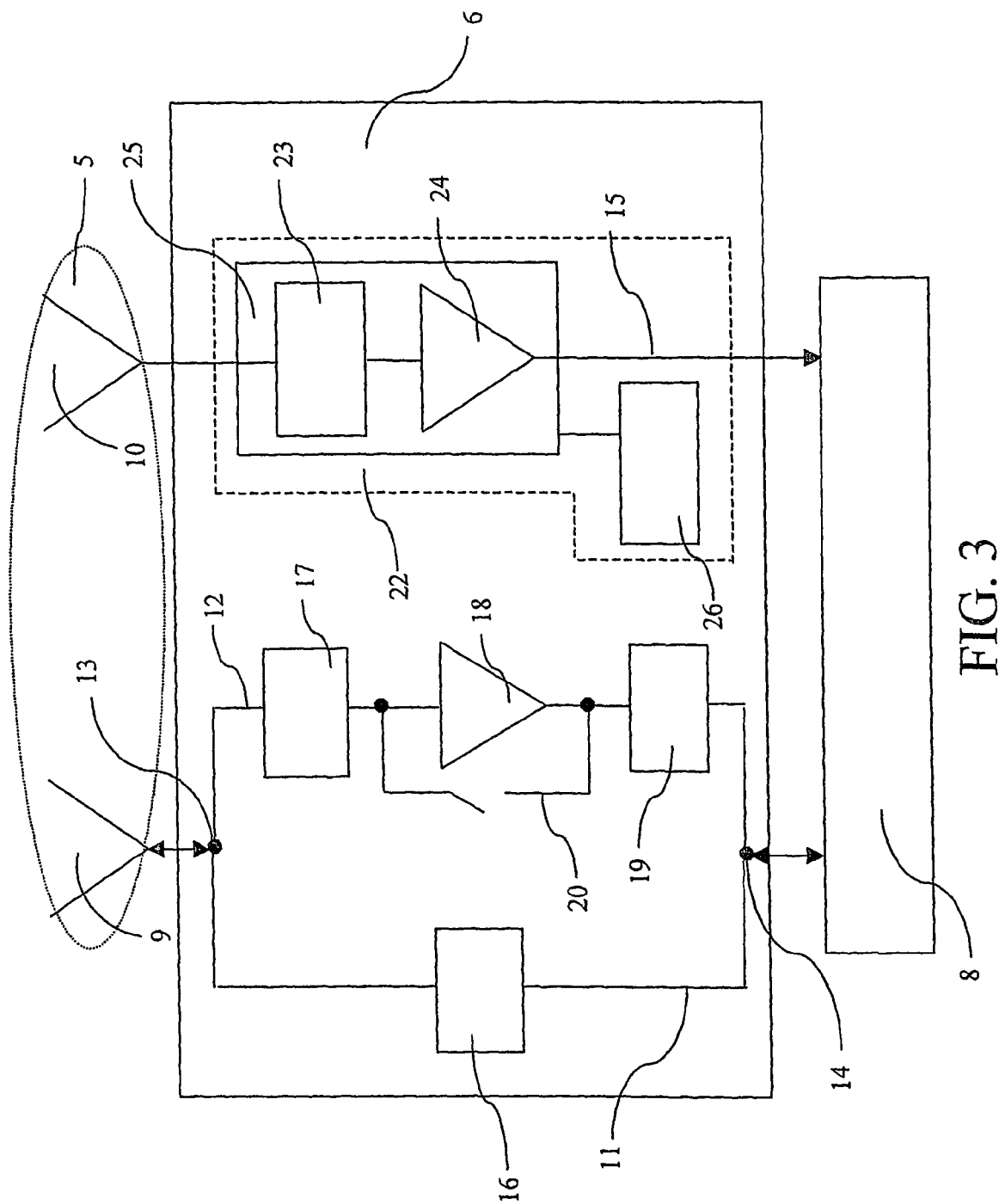
FIGS. 3, 4 are schematic representations of different aspects of a first embodiment of a receiver front-end according to the present invention.
Figure 4:
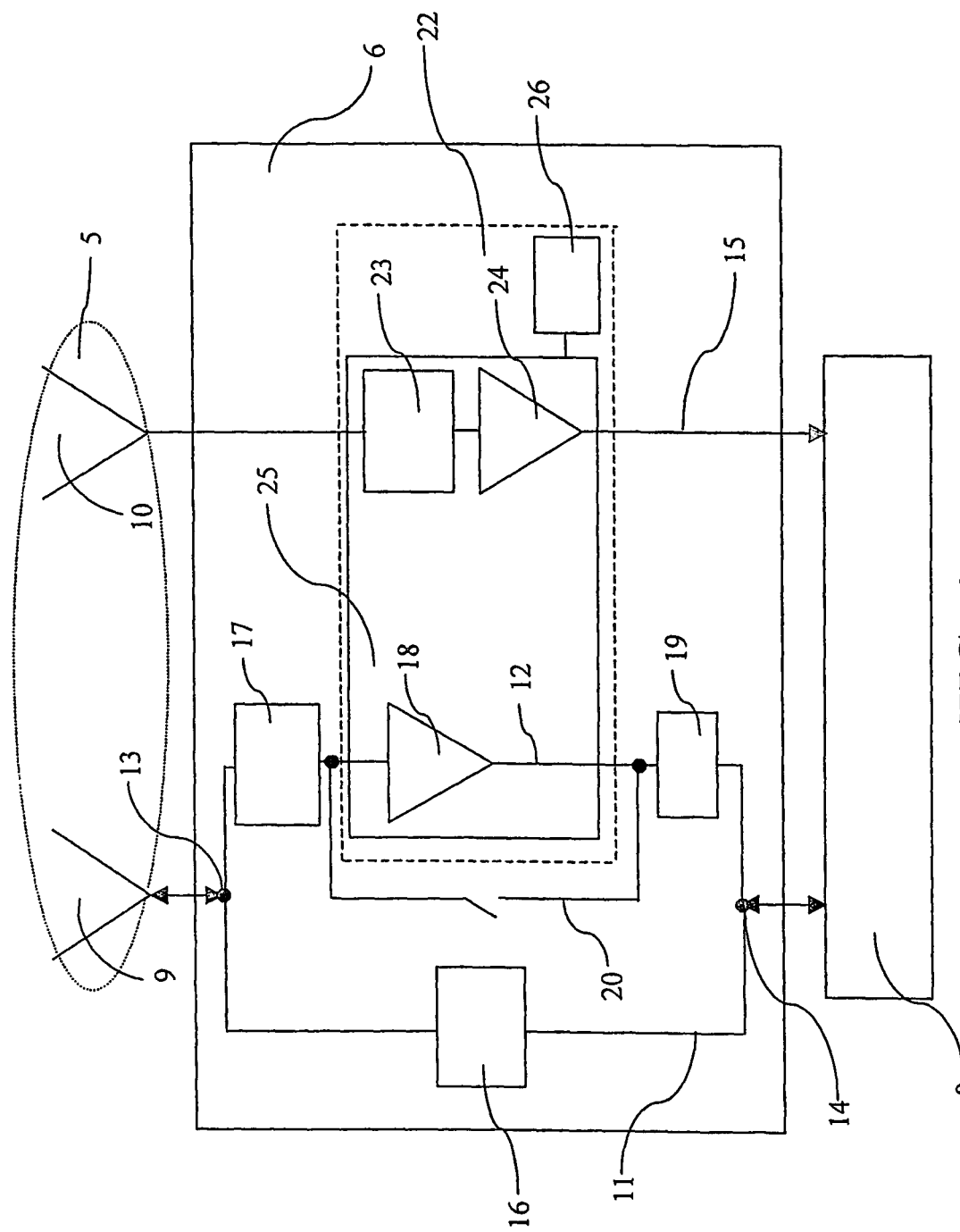

In a first embodiment of the present invention, shown in FIGS. 3 and 4, the primary antenna 9 acts as both transmitting and receiving antenna, while the secondary antenna 10 acts only as a receiving antenna.

In this case, the receiver front-end 6 includes a transmission branch 11 and a primary receiving branch 12 connected in parallel between first and second node 13, 14; the first node 13 being coupled to the primary antenna 9 and the second node 14 being coupled to the signal processing sections 8 of the transceiver station 3. The receiver front-end 6 also include at least a secondary receiving branch 15 inserted between the secondary antenna 10 and the signal processing sections 8 of the transceiver station 3.

According to the present invention, the primary receiving branch 12 comprises non-superconducting components while the secondary receiving branch 15 comprises superconducting components.

By the term "component" it is meant, throughout the present description and claim, an active or passive electronic component, such as a filter or any of the active or passive components included in an amplifier, either in a discrete or integrated arrangement, such as, for example, conductors, resistors, capacitors, inductors, diodes, transistors.

In a first aspect of the present invention shown in FIG. 3, the primary receiving branch 12 can have, for example, a noise figure of about 1.8 dB while the secondary receiving branch 15 can have, for example, a noise figure in the range of about 0.5÷0.7 dB (at a frequency around 2 GHz).

Specifically, the transmission branch 11 comprises a transmitting filter 16 while the primary receiving branch 12 comprises a first receiving filters 17 cascade-connected to a non-cryogenic, low-noise amplifier 18 and to a second receiving filter 19.

The transmitting filter 16 and the receiving filters 17, 19 are conventional filters. Alternatively, they can operate at cryogenic temperatures.

The primary receiving branch 12 also includes a bypass circuit 20 connected in parallel to the non-cryogenic low-noise amplifier 18 and operating as a redundant branch when the non-cryogenic low-noise amplifier 18 fails. In alternative, the redundant branch can be made by a non-cryogenic, low-noise amplifier.

The secondary receiving branch 15 comprises a cryogenic refrigerator unit 22 enclosing a low-loss filter 23 and a low-noise amplifier (LNA) 24, mutually connected in cascade arrangement.

More specifically, the low-loss filter 23 and the low-noise amplifier 24 are both enclosed in a cryostat 25 kept at cryogenic temperatures by a cryocooler 26. Both the cryostat 25 and the cryocooler 26 are comprised in the cryogenic refrigerator unit 22.

In the remainder of the present description we shall define as low-loss filter a filter having an insertion loss (that for passive electronic components, such as filters coincides with the noise figure) lower than 0.7 dB, more preferably lower than 0.5 dB, still more preferably lower than 0.3 dB. The low-loss filter 23 is made with a technology based on High critical Temperature Superconductors (HTS) to provide high rejection and low insertion loss.

A filter of this type is for example disclosed in "Passive microwave device applications of high-temperature superconductors" M. J. Lancaster, Cambridge University Press 1997 (and references cited therein).

The cryogenic refrigerator unit 22 according to the present invention may operates at cryogenic temperatures ranging between 60 K and 250 K and, more preferably, between 60 K and 100 K.

A suitable cryogenic refrigerator unit is for example described in "Low-power cryocooler survey", H. J. M. ter Brake, G. F. M. Wiegerinck, Cryogenics Volume 42, Issue 11, November 2002, Pages 705-718.

In operation, the radio signal received by the primary antenna 9 (primary radio signal) is sent to the first node 13 while the radio signal received by the secondary antenna 10 (secondary radio signal) is sent directly to the cryogenic refrigerator unit 22.

In the first node 13 the primary radio signal is addressed to the primary receiving branch 12 and filtered by the first receiving filter 17. The filtered receiving signal is then amplified by the non-cryogenic, low-noise amplifier 18 and sent to the signal processing sections 8 of the transceiver station 3 through the second receiving filter 19 and the second node 14.

The primary transmission branch 11 is used for the RF communication between the transceiver station 3 and the plurality of communication devices located in the cell supervised by the transceiver station 3.

In the cryogenic refrigerator unit 22 the secondary radio signal is filtered by the low-loss filter 23 which is able to select a desired frequency band within the communication band. Then, the filtered secondary radio signal is amplified by the low-noise amplifier 24 working at cryogenic temperatures, without introducing any relevant losses. The resulting secondary radio signal is then sent to the signal processing sections 8 of the transceiver station 3.

In a second aspect of the present invention, shown in FIG. 4, the primary receiving branch 12 can have, for example, a noise figure of about 1.2 dB while the secondary receiving branch 15 still has a noise figure in the range of about 0.5÷0.7 dB (at a frequency around 2 GHz).

In this case, the low-noise amplifier 18 of the primary receiving branch 12 is preferably enclosed in the cryogenic refrigerator unit 22. Alternative, the low-noise amplifier 18 of the primary receiving branch 12 can be enclosed in a separated cryogenic refrigerator unit (not shown in FIG. 4).

More specifically, the low-loss filter 23, the low-noise amplifier (LNA) 24 of the secondary receiving branch 15 and the low-noise amplifier 18 of the primary receiving branch 12 are enclosed in the cryostat 25.

The other parts of the receiver front-end 6 are the same as those described with reference to FIGS. 3 and 4 therefore they will not be described again.

In operation, the radio signal received by the primary antenna 9 (primary radio signal) is sent to the first node 13 while the radio signal coming from the secondary antenna 10 (secondary radio signal) is sent directly to the cryogenic refrigerator unit 22.

In the first node 13 the primary radio signal is addressed to the primary receiving branch 12 and filtered by the first receiving filter 17. Then the filtered primary radio signal is sent to the cryogenic refrigerator unit 22 and amplified by the low-noise amplifier 18 without introducing any relevant losses. Subsequently, the resulting receiving signal is sent to the signal processing sections 8 of the transceiver station 3 through the second receiving filter 19.

In the cryogenic unit 22 the secondary radio signal is filtered by the low-loss filter 23 which is able to select a desired frequency band within the communication band. Then, the filtered secondary radio signal is amplified at cryogenic temperatures by the low-noise amplifier 24 without introducing any relevant losses. The resulting secondary radio signal is then sent to the signal processing sections 8 of the transceiver station 3.

Figure 5:
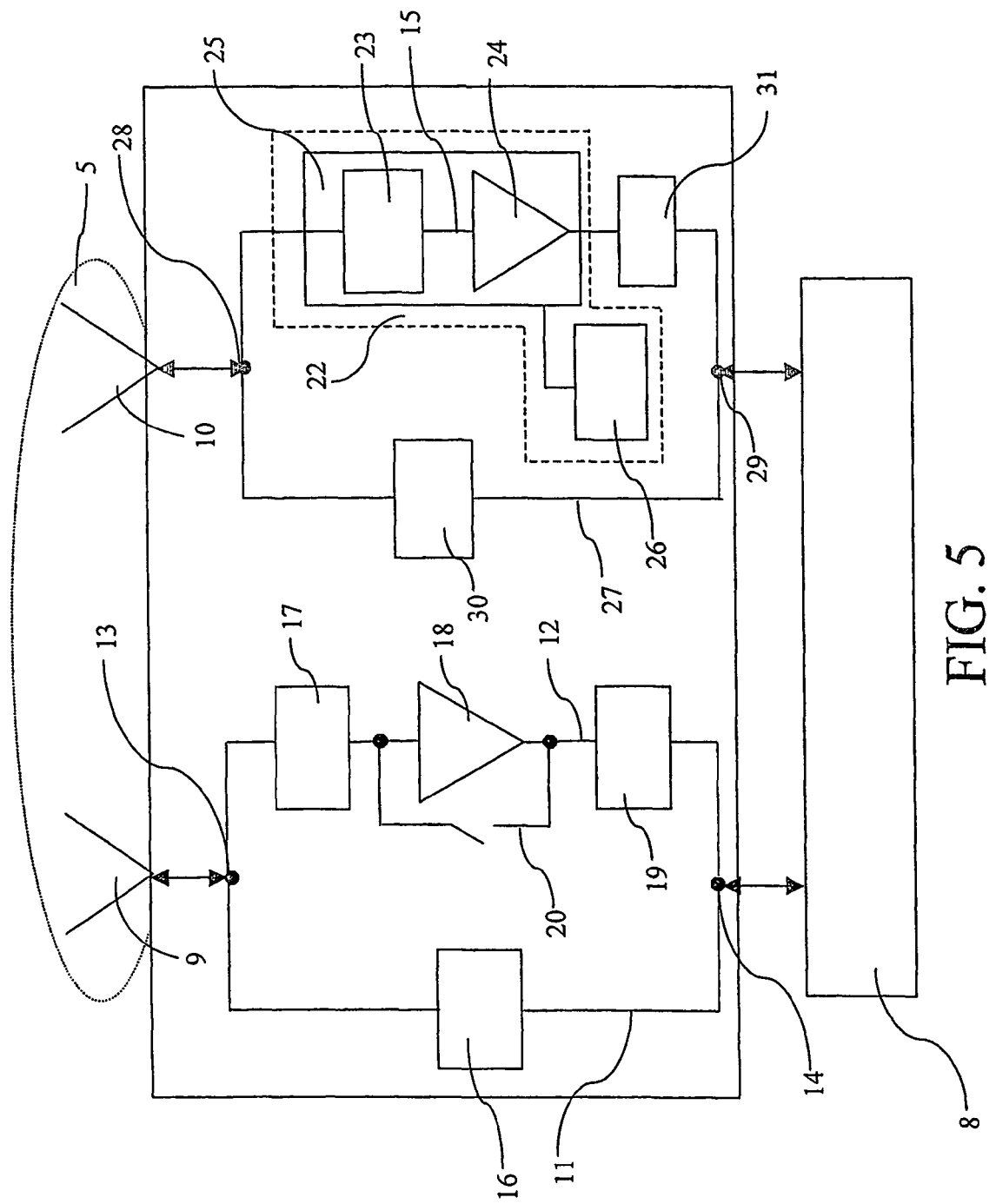
FIGS. 5, 6 are schematic representations of different aspects of a second embodiment of the receiver front-end of the present invention.
Figure 6:
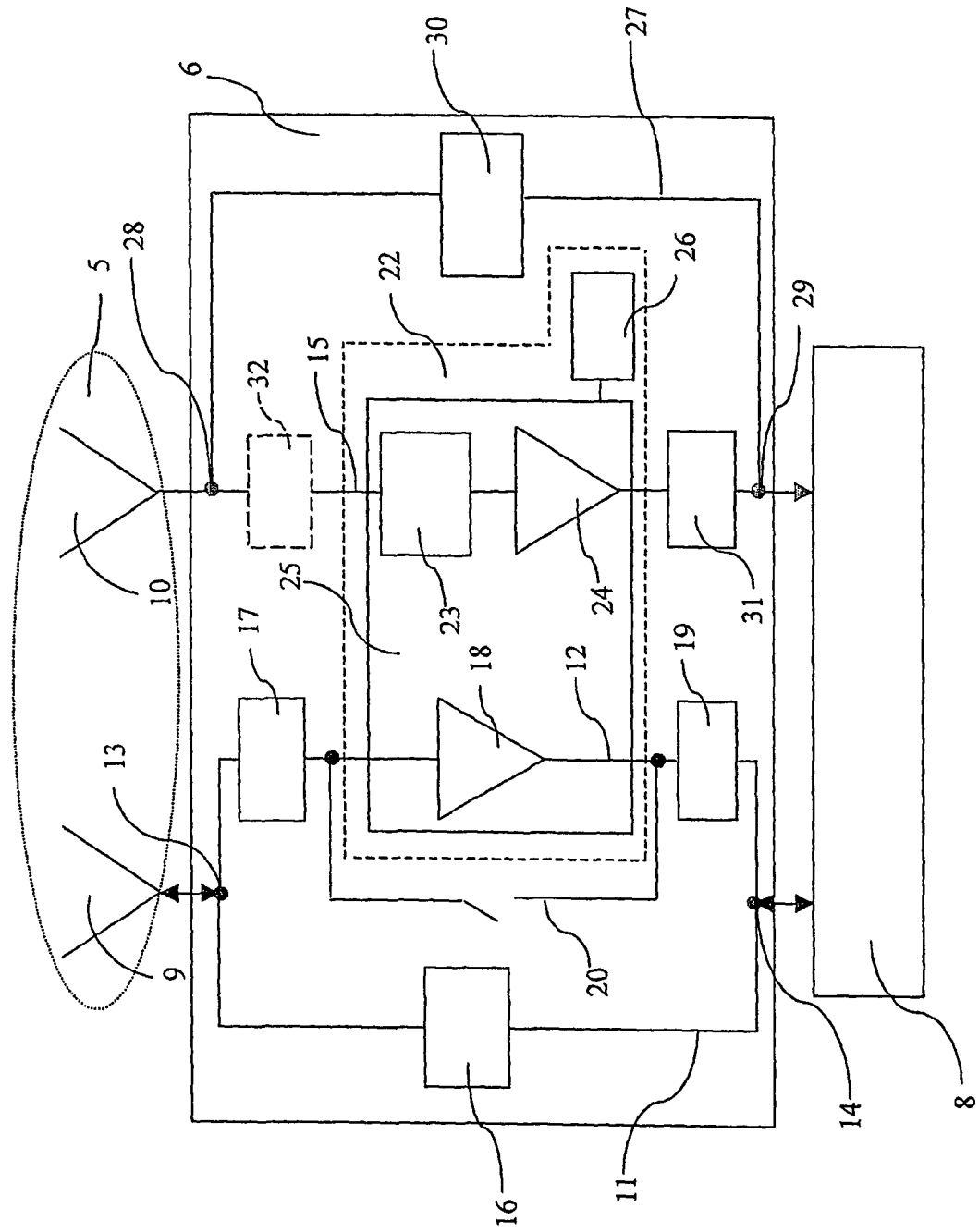

In a second embodiment of the present invention, shown in FIGS. 5, 6, both the primary antenna 9 and the secondary antenna 10 act as transmitting and receiving antennas.

In this case, the secondary receiving branch 15 of the receiver front-end 6 is connected in parallel to a secondary transmission branch 27. The secondary transmission branch 27 and the secondary receiving branch 15 are inserted between first and second nodes 28, 29; the first node 28 being coupled to the secondary antenna 10 and the second node 29 being coupled to the signal processing sections 8 of the base transceiver station 3. The secondary transmission branch 27 comprises a transmitting filter 30 while the secondary receiving branch 15 comprises a further receiving filter 31 inserted between the cryogenic refrigerator unit 22 and the second node 29.

The transmitting filter 30 may be a conventional filter or it may be an HTS filter. In this latter case the transmitter filter 30 is disposed within the cryostat 25 of the cryogenic refrigerator unit 22.

The further receiving filter 31 may be a conventional filter or it may be a cryogenic filter. In this latter case it is disposed within the cryostat 25 of the cryogenic refrigerator unit 22.

As shown in FIG. 6, the secondary receiving branch 15 can also comprise a conventional receiving filter 32 inserted between the first node 28 and the cryogenic refrigerator unit 22.

The other parts of the receiver front-end 6 are the same as those described with reference to FIGS. 3 and 4 therefore they will not be described again.

In operation, the secondary transmission branch 27 is used for the RF communication between the transceiver station 3 and the plurality of communication devices located in the cell supervised by the transceiver station 3.

In the embodiments shown in FIGS. 4 and 6, the primary branches 11, 12 and the secondary branches 15, 27 can be respectively connected to antennas serving different sectors. Each sector is designed to receive signals from different geographic areas covered by the same transceiver station.

Hereafter, the performance of the receiver front-end according to aspects and embodiments of the present invention are analysed in terms of its efficiency and capacity of managing traffic and compared with those of prior art receiver front-ends.

It is important to note that fading of electromagnetic signals (such as radio signals) due to scattering and interference processes is one of the major limiting factors in the performance of a receiver front-end. Micro diversity concept, i.e. the mixing of radio signals coming from antennas belonging to different branches of a receiver, through suitable algorithms implemented by the transceiver station, has been developed to reduce such fading effects. Generally, the diversity algorithm operates in such a way that radio signals $r_1(t)$ and $r_2(t)$ coming for example from two different branches of the receiver front-end are combined by means of algorithm-dependent weights, i.e. $r(t)=a_1*r_1(t)+a_2*r_2(t)$ (with weights $a_1$ and $a_2$). The signals obtained after this manipulation will have a statistical distribution in terms of Signal to Noise Ratio (SNR) different from the original signals considered independently. In particular, the probability to have larger values of SNR is higher after such combining algorithms. Consequently, a positive effect on the overall capacity and efficiency of the transceiver station is expected since only signals capable to sustain a qualitatively acceptable call, i.e. with a SNR above a certain given threshold defined by the operators, are considered. The diversity algorithm commonly used in $3^{rd}$ generation (3G) wireless communication networks (for example UMTS) is the so called "maximal ratio combiner" method. Essentially, this algorithm uses weights which are the square roots of the SNR of the single branches of the receiver obtaining an SNR for the combined signal $\xi=\xi_1+\xi_2$ equal to the sum of the SNR of each branch. In this way the resulting SNR is always better than those of the two separate branches and therefore an overall improvement in the wireless communication network performances is expected. But in order to make a much more refined analysis, as required to quantitatively compare capacity and efficiency of different receiver front-ends, some theoretical considerations are highlighted in the following.

In practical terms this means to evaluate the correspondent probability $P(\xi > \xi_t)$ for a generic receiver front-end configuration having at least two receiving branches with noise figure $N_{f1}$ and $N_{f2}$, respectively. The term $P(\xi > \xi_t)$ is the probability to have a SNR value greater than a given operator-defined threshold value $\xi_t$.

This term is particularly relevant because it is correlated to the receiver front-end efficiency and capacity in terms of managed traffic. In fact, wireless network efficiency is improved by increasing the number of calls having a quality, in terms of SNR, high enough to be managed. On the other hand, uplink capacity is increased because statistically less power is needed to sustain a call having the same SNR.

In order to make the problem analytically solvable the Applicant has made some reasonable assumptions about statistical distributions of radio signals and noise correlations. In particular the Applicant has assumed that:

a. The signal r(t) at the transceiver station is the envelope of weighted signals $a_1*r_1(t)$ and $a_2*r_2(t)$ coming from the two receiving branches respectively. More specifically $r(t)=a_1*r_1(t)+a_2*r_2(t)$ with $a_1$ and $a_2$ having appropriate values for the "maximal ratio combiner" algorithm.

b. The statistical distribution of the radio signals in the wireless communication network for each receiving branch of the receiver front-end follows the Rayleigh distribution, which in term of SNR should be read as:

$$p(\xi_i) = \frac{e^{\xi_i/\xi_0^i}}{\xi_0^i}$$

where $\xi_o^i$ is the average signal to noise ratio of the i-th receiving branch: $\xi_o^i = <r_i(t)^2>/N_f^i$, $\xi^i$ is the actual value for the SNR: $\xi_i = r_i(t)^2/2N_f^i$ and $N_f^i$ is the noise figure of the i-th receiving branch.

c. Noise in each receiving branch is independent from radio signals and radio signals are statistically independent.

Such assumptions describe the behaviour of an ideal receiver front-end. They are reasonable approximations especially in urban area where radio signals coming from the two receiving branches are more uncorrelated but nevertheless they are appropriate for our comparative purposes.

The probability $P(\xi > \xi_t)$ has the following expression:

$$P(\xi > \xi_i) = \int_{\xi_i}^{\infty} p_{Joint}(\xi) d\xi$$

where $p_{joint}(\xi)$ is the probability to have a SNR value equal to $\xi$ at the transceiver station level after the operations by the diversity algorithm. In particular:

$$p_{joint}(\xi) = \int_0^{\infty} p(\xi_1) p(\xi - \xi_1) d\xi_1$$

where the equation $\xi=\xi_1+\xi_2$ and the statistical independence of the probability distributions of SNR within the two receiving branches have been exploited. Introducing the Rayleigh distributions of the SNR in each receiving branch and solving the integrals, the following final expression is obtained:

$$P(\xi > \xi_i) = \frac{\xi_0^2 e^{-\xi_t/\xi_0^2} - \xi_0^1 e^{-\xi_t/\xi_0^i}}{\xi_0^2 - \xi_0^1}$$

where the probability P ($\xi > \xi_t$) is expressed in terms of the SNR threshold value $\xi_t$ and both the SNR mean values of the radio signals and the Noise figure contribution of each receiving branch i: $\xi_0^i = \xi_0/N_f^i$.

At this point, the Applicant has determined reasonable value for $\xi_0$, $N_{fi}$ and $\xi_t$.

In particular, values for $N_{fi}$ can be determined using the general expression:

$$N_f = N_1 + \frac{\sum_{i=2}^{n}(N_f^i - 1)}{\prod_{j=1}^{i-1} G_j}$$

valid for a receiving branch comprising multiple (n) stages of amplification and filtering. Alternatively, values for $N_{fi}$ can be obtained experimentally.

Values for $\xi_t$ can be determined by the expression:

$\xi_t = E_b/N_o - G$ where $E_b/N_o$ is the ratio between the power spectral density for bit and the total noise due to electromagnetic interference and thermal effects, and G is the processing gain due to the despreading procedure of electromagnetic signals. Table 1 set out below shows typical values of $\xi_t$, $E_b/N_o$ and G referred to four different types of service provided by the wireless communication network 1:

TABLE 1

| Services | $\xi_t$ (dB) | $E_b/N_o$ (dB) | G (dB) |
|---|---|---|---|
| Voice | −18.2 | 6.5 | 24.7 |
| Data 64 kb/s | −13.6 | 4.2 | 17.8 |
| Data 144 kb/s | −11.15 | 3.1 | 14.25 |
| Data 384 kb/s | −7.5 | 2.5 | 10 |

Concerning $\xi_0$ values, the Applicant has observed that they are site-dependent owing to changes in both electromagnetic interference and propagation conditions of electromagnetic wave moving from site to site.

In any case these values usually are few dB larger than $\xi_t$ values. In order to check the stability of the results obtained with respect to site variability, the Applicant has considered $\xi_0$ values larger than $\xi_t$ values by 1, 2, 3 dB.

Then the Applicant has compared the performances of different types of receiver front-ends indicated respectively with A, B1/B2, C1/C2, D1/D2 in Table 2 set out below. Each receiver front-end comprises a main receiving branch having noise figure $N_{f1}$ and a diversity receiving branch having noise figure $N_{f2}$. Values of $N_{f1}$ and $N_{f2}$ are shown in Table 2.

TABLE 2

| $N_f$ branches | A | B1/B2 | C1/C2 | D1/D2 |
|---|---|---|---|---|
| $N_{f1}$ | 1.8 | 0.7/0.7 | 1.8/1.8 | 1.2/1.2 |
| $N_{f2}$ | 1.8 | 0.5/0.7 | 0.5/0.7 | 0.5/0.7 |

Specifically, each receiving branch comprises a filter and a low noise amplifier mutually connected in cascade arrangement. Receiver front-ends A and B1/B2 are known receiver front-ends while receiver front-ends C1/C2 and D1/D2 are made according to the present invention. In particular:

receiver front-end A has both main and diversity receiving branches comprising non-cryogenic components (filters and low noise amplifiers);

receiver front-ends B1 and B2 have both main and diversity receiving branches comprising cryogenic, superconducting components (HTS filters and cryogenic low-noise amplifiers). In particular, the receiver front-end indicated with B2 includes also a diversity transmission branch;

receiver front-ends C1 (shown in FIG. 3), D1 (shown in FIG. 4), C2 (shown in FIG. 5), D2 (shown in FIG. 6) have main receiving branches comprising non-superconducting components and diversity receiving branches comprising superconducting components, according to the present invention. In particular, the receiver front-end indicated with C2 and D2 include also the diversity transmission branches.

Simulation results obtained with the noise figure values of Table 2 and a mean value for $\xi_0$ that is 2 dB greater than $\xi_t$ value ($\xi_0 = \xi_t + 2$ dB) are shown in FIG. 5.

Figure 7:
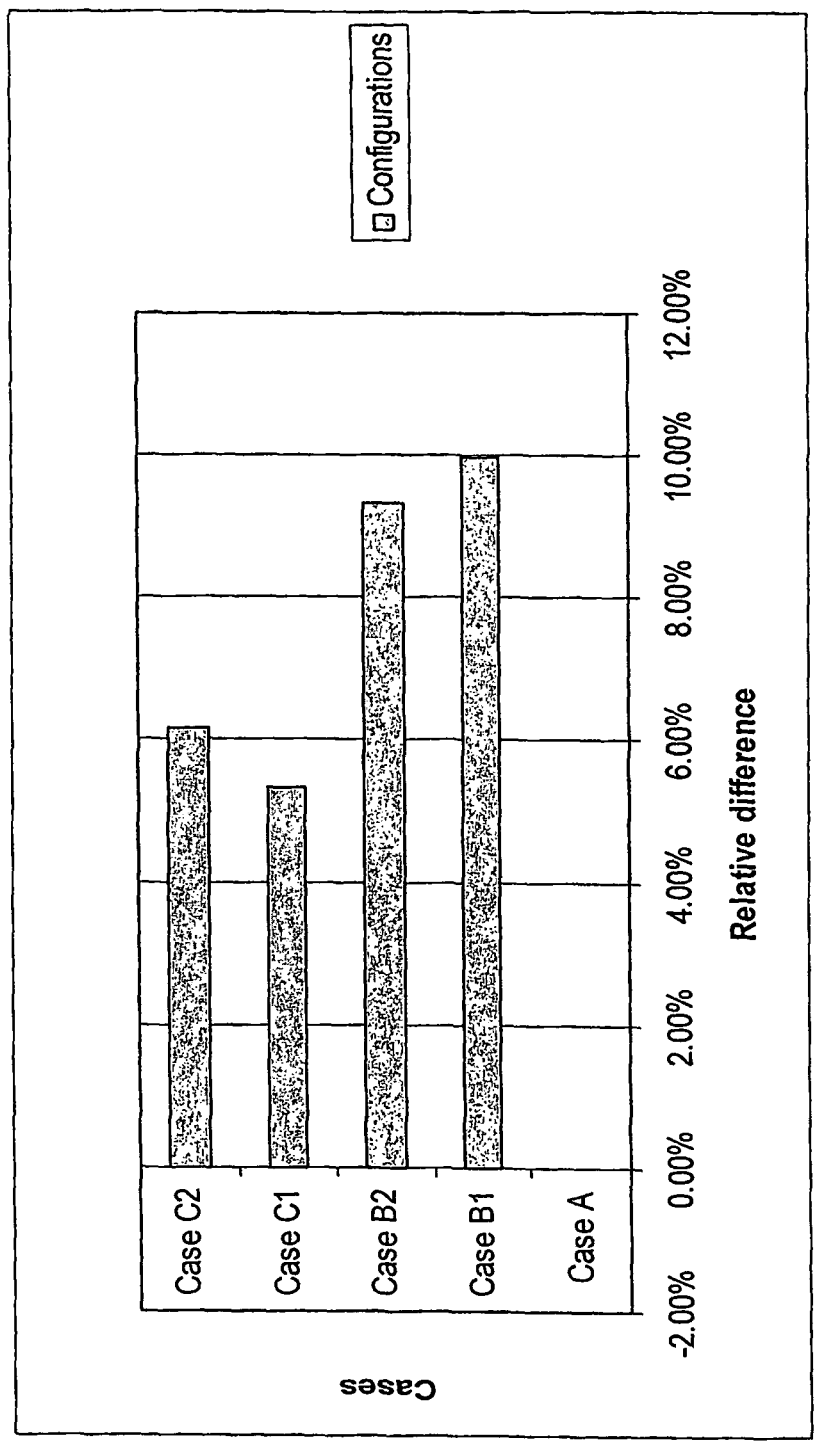
FIGS. 7-10 show comparison between performances of different types of receiver front-ends.
Figure 9:
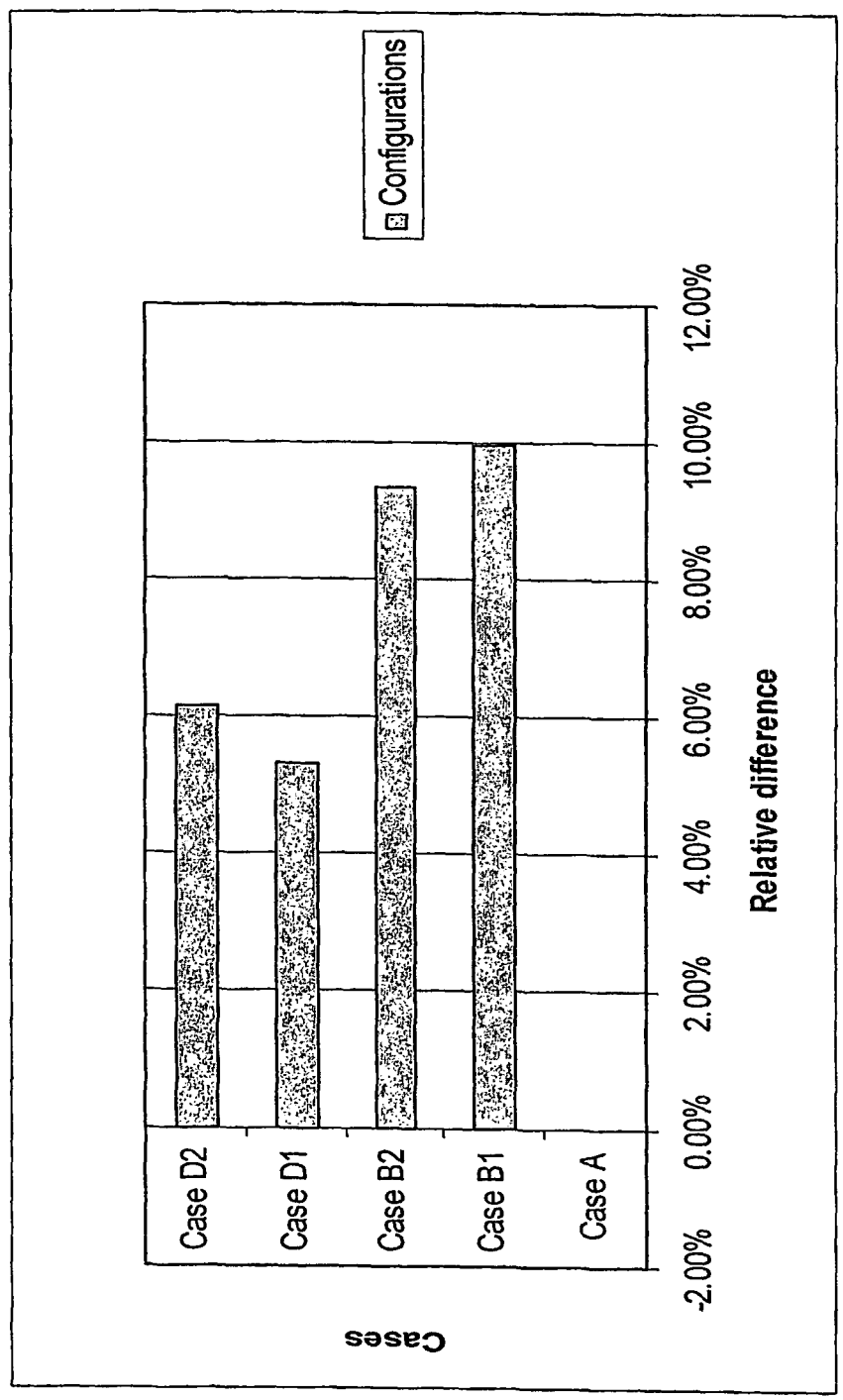

Specifically, FIG. 7 illustrates the relative difference in the probability $P(\xi > \xi_t)$ of receiver front-ends B1/B2 and C1/C2 compared to receiver front-end A, representing the standard Tower Mounted Amplifier (TMA) technology, while FIG. 9 illustrates the relative difference in the probability $P(\xi > \xi t)$ of receiver front-ends B1/B2 and D1/D2 compared to receiver front-end A.

Concerning receiver front-ends C1/C2 and D1/D2 according to the present invention it should be noted that advantages in terms of performances in managing traffic are estimated to be larger than 5.3% and 7% respectively, compared to receiver front-end A.

Further, the performances of receiver front-ends C1/C2 and D1/D2 appear to be very good even in comparison with the performances of receiver front-ends B1/B2 employing cryogenic technology. In fact, performance of receiver front-ends C1/C2 are of the order of 4% smaller than those of receiver front-ends B1/B2, while performance of receiver front-ends D1/D2 are of the order of 1±2% smaller than those of receiver front-ends B1/B2. However, in spite of this difference, receiver front-ends C1/C2 and D1/D2 have an improved reliability. In fact, in case of failure of the cryocooler (that is typically the most critical component in a cryogenic receiver), receiver front-ends B1/B2 do not work anymore, because HTS filters at room temperature disconnect the antenna from the transceiver station. Instead, receiver front-ends C1/C2 and D1/D2 according to the present invention can be operative even at room temperature and with a reduced sensitivity. This because the main receiving branch still works at room temperature (it comprises non-superconducting components) and roughly it will have the same performances of a single branch of a conventional non-cryogenic receiver front-end (like receiver front-end A).

Additionally, receiver front-end D1/D2 need a severe control of the temperature, at cryogenic temperatures as large as 70 K, only in a surface region where super conductive material comprised in HTS filters is displaced. In the remaining space of the cryogenic refrigerator unit, occupied by the other cryogenic components, this strict control is no more necessary since cryogenic low-noise amplifiers can work even at much larger temperatures (120K÷150K). Therefore, even large gradients of temperature are not problems in this case leading only to a substantial degradation in the performances of the receiver. Instead, such strict control is necessary for the receiver front-ends B1/B2.

Having much lower constraints in terms of operating temperatures in a significant portion of the cryogenic refrigerator unit means that much less power is required to cool down said cryogenic refrigerator unit. Since this power is directly correlated to both the crycooler reliability and its MTBF (Mean Time Before Failure), a much larger reliability and thus much longer MTBF can be achieved. Just to give some reference numbers, typically, a cryogenic refrigerator unit operating at temperature of 70 K has an MTBF of about 50000 h, while a cryogenic refrigerator unit operating at temperatures of 120 K has a MTBF of about 150000 h.

Moreover, both receiver front-ends C1/C2 and D1/D2 have dimensional advantages due to the fact that a rather small cryocooler is required because a lower number of active components should be cooled down.

The Applicant has further analysed the behaviour of the term $P(\xi > \xi_t)$ as a function of different values of $\xi_0$.

Figure 8:
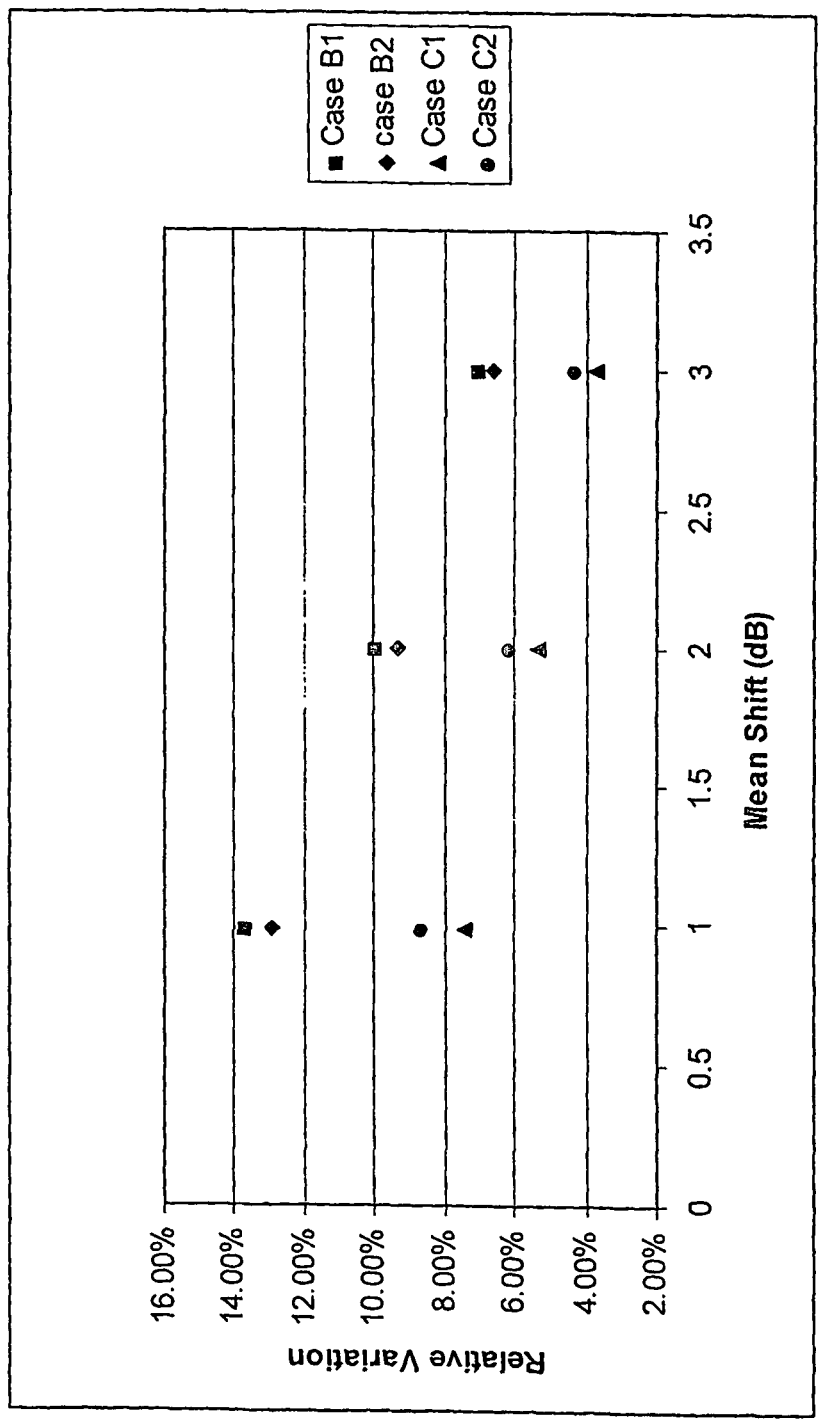
Figure 10:
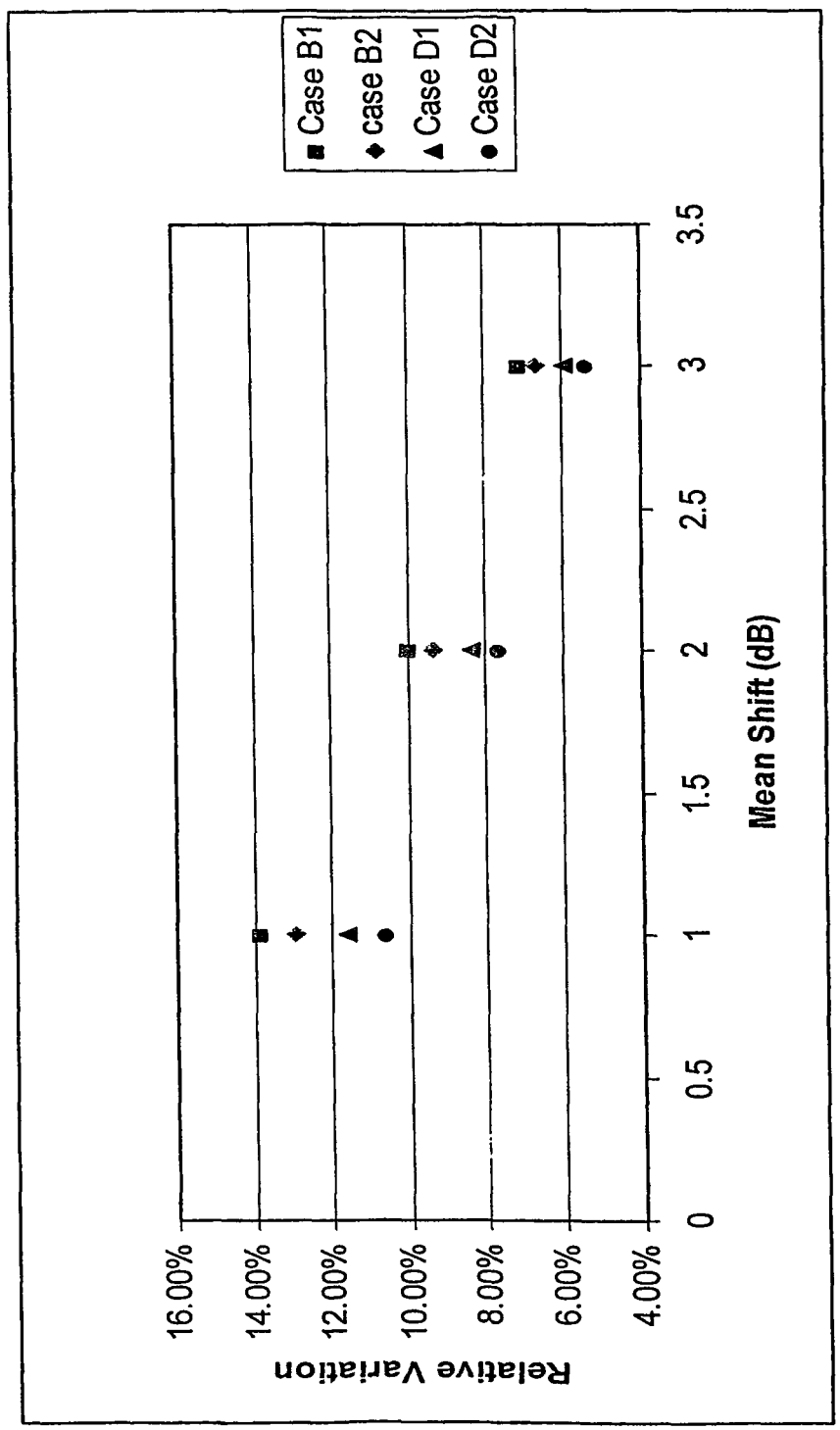

More specifically, FIGS. 8, 10 show simulation results obtained with values of $\xi_0$ larger than values of $\xi_t$ by 1, 2 and 3 dB, respectively.

From these figures, it is clear that simulation results disclosed above are qualitatively stable with respect to changes in the values of $\xi_0$, even if the term $P(\xi > \xi_t)$ increased when difference between $\xi_0$ and $\xi_t$ decrease as a consequence of the lowering in the Rayleigh distributions of the SNR associated to each receiving branch.

Finally, it is clear that numerous variations and modifications may be made to the receiver front-ends described and illustrated herein, all falling within the scope of the invention, as defined in the attached claims.

The invention claimed is:

1. A receiver front-end for use in a transceiver station of a wireless communication network, said transceiver station being associated with an antenna assembly comprising a primary and at least a secondary antenna, said receiver front-end being adapted for insertion between said antenna assembly and signal processing sections of said transceiver station, said receiver front-end comprising a primary and at least a secondary receiving branch, said primary receiving branch being adapted for coupling to said primary antenna and to said signal processing sections of said transceiver station and for communicating radio signals received by said primary antenna to said signal processing sections, and said secondary receiving branch being adapted for coupling to said secondary antenna and to said signal processing sections and for communicating radio signals received by said secondary antenna to said signal processing sections simultaneous with and independent from said primary receiving branch, said secondary receiving branch comprising at least one superconducting component, wherein said primary receiving branch consists of only non-superconducting components including at least one non-superconducting filter.

2. The receiver front-end according to claim 1, wherein said superconducting component comprises a low-loss filter obtained with a technology based on high critical temperature superconducting materials.

3. The receiver front-end according to claim 2, wherein said low-loss filter has a noise figure lower than 0.7 dB.

4. The receiver front-end according to claim 2, wherein said low-loss filter has a noise figure lower than 0.5 dB.

5. The receiver front-end according to claim 2, wherein said low-loss filter has a noise figure lower than 0.3 dB.

6. The receiver front-end according to claim 2, wherein said secondary receiving branch comprises a cryogenic, low-noise amplifier cascade connected to said low-loss filter.

7. The receiver front-end according to claim 6, wherein said low-loss filter and said cryogenic, low-noise amplifier are both enclosed in a cryogenic refrigerator unit.

8. The receiver front-end according to claim 7 wherein said cryogenic refrigerator unit operates at cryogenic temperatures lower than 250 K.

9. The receiver front-end according to claim 7, wherein said cryogenic refrigerator unit operates at cryogenic temperatures lower than 100 K.

10. The receiver front-end according to claim 7, wherein said cryogenic refrigerator unit operates at cryogenic temperatures higher than 60 K.

11. The receiver according to claim 1, wherein said primary receiving branch comprises a non-superconducting receiving filter and a non-cryogenic, low-noise amplifier mutually connected in cascade arrangement.

12. The receiver according to claim 1, wherein said primary receiving branch comprises a non-superconducting receiving filter and a cryogenic, low-noise amplifier mutually connected in cascade arrangement.

13. The receiver according to claim 12, wherein said low-loss filter, said cryogenic, low-noise amplifier of said primary receiving branch and said cryogenic, low-noise amplifier of said secondary receiving branch are enclosed in a cryogenic refrigerator unit.

14. The receiver front-end according to claim 1, wherein said primary receiving branch is connected in parallel to a primary transmission branch, said primary transmission branch comprising a transmitting filter.

15. The receiver front-end according to claim 1, wherein said secondary receiving branch is connected in parallel to a secondary transmission branch, said secondary transmission branch comprising a transmitting filter.

16. The receiver front-end according to claim 15, wherein said transmitting filter in said secondary transmission branch is obtained with a technology based on high critical temperature superconducting materials.

17. The receiver front-end according to claim 1, wherein the receiver front-end is mounted at such a distance from said antenna assembly that losses due to antenna lead-in are negligible with respect to the noise figure introduced by said receiver front-end.

18. The receiver front-end according to claim 17, wherein said distance is no greater than 3 m.

19. The receiver front-end according to claim 18, wherein said distance is no greater than 1 m.

20. A transceiver station of a wireless communication network, said transceiver station being associated with an antenna assembly comprising a primary and at least a secondary antenna, comprising a receiver front-end being adapted for insertion between said antenna assembly and signal processing sections of said transceiver station, said receiver front-end comprising a primary and at least a secondary receiving branch, said primary receiving branch being adapted for coupling to said primary antenna and to said signal processing sections of said transceiver station and for communicating radio signals received by said primary antenna to said signal processing sections, said secondary receiving branch being adapted for coupling to said secondary antenna and to said signal processing sections and for communicating radio signals received by said secondary antenna to said signal processing sections simultaneous with and independent from said primary receiving branch, said secondary receiving branch comprising at least one superconducting component, wherein said primary receiving branch consists of only non-superconducting components including at least one non-superconducting filter, wherein said signal processing sections are coupled to said receiver front-end.

* * * * *